Figure 1:
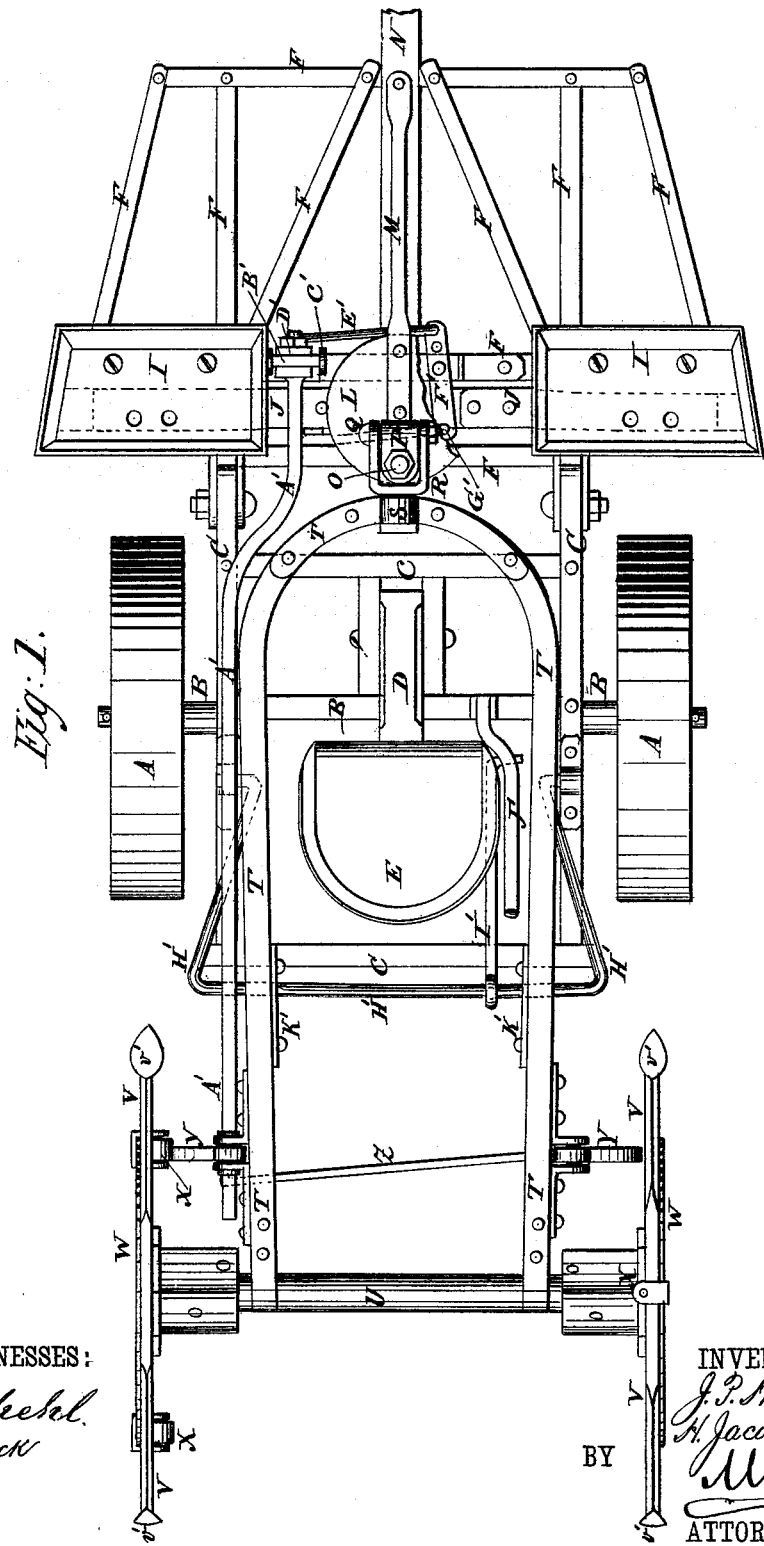

2 Sheets—Sheet 1.

J. P. HALL & H. JACOBSEN.
Seed-Dropping Attachment for Planter.

No. 220,142. Patented Sept. 30, 1879.

WITNESSES:
A. Schehl.
C. Sedgwick.

INVENTOR:
J. P. Hall
H. Jacobsen
BY Munn & Co
ATTORNEYS.

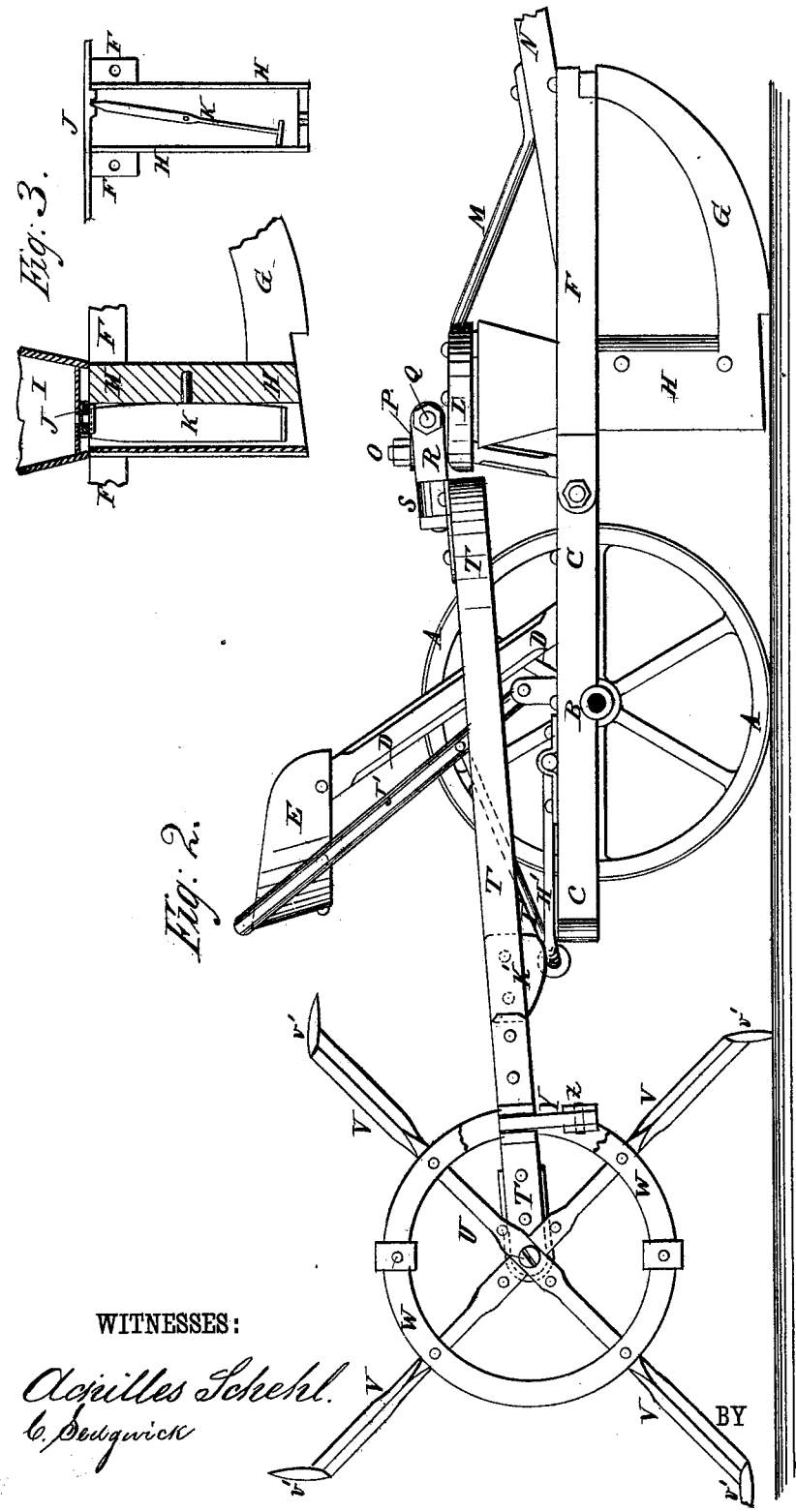

UNITED STATES PATENT OFFICE.

JAMES P. HALL AND HENRY JACOBSEN, OF NIANTIC, ILLINOIS.

IMPROVEMENT IN SEED-DROPPING ATTACHMENTS FOR PLANTERS.

Specification forming part of Letters Patent No. 220,142, dated September 30, 1879; application filed December 30, 1878.

*To all whom it may concern:*

Be it known that we, JAMES P. HALL and HENRY JACOBSEN, of Niantic, in the county of Macon and State of Illinois, have invented a new and useful Improvement in Seed-Dropping Attachments for Planters, of which the following is a specification.

Figure 1, Sheet 1, is a top view of our improved attachment, shown as applied to a planter. Fig. 2, Sheet 2, is a side view of the same. Fig. 3, Sheet 2, is a vertical section of one of the planter-standards and a rear view of the same, the rear plate being removed.

Similar letters of reference indicate corresponding parts.

Our invention is an improvement in the class of check-row planters; and it relates to the construction and arrangement of parts whereby the rotating marker-wheels vibrate the seed-slide at the same time that the said wheels are free to oscillate and follow the inequalities of the surface of the soil, as hereinafter described.

A represents the wheels of the carriage, which revolve upon the journals of the axle B. To the axle B is rigidly attached the frame C, to which, a little in front of the axle B, is attached the lower end of the seat-standard D. The seat-standard D inclines to the rearward, and to its upper end is attached the driver's seat E.

To the forward ends of the side bars of the carriage-frame C is hinged the rear end of the planter-frame F, to which are attached the runners G, that open the ground to receive the seed, the hollow standards H, that conduct the seed to the ground in the cavities of the forked rear ends of the runners G, and the seed-boxes I.

The seed is removed from the seed-boxes I by the slide J, which is operated in the manner hereinafter described. As the seed drops into the cavity of the standards H it is stopped at the lower end of the said standards by the flanged lower ends of the bars K, which are pivoted to the said standards, and have their upper ends connected with the dropping-slide J, so that they may be vibrated by the movements of the said slide. By this arrangement the seeds will be dropped to the ground promptly and all together.

To the center of the rear part of the planter-frame F is firmly attached a support, L, which is strengthened against the draft-strain by the brace M. The forward end of the brace M is attached to the tongue N or to the forward part of the planter-frame F.

To the support L is firmly attached an upwardly-projecting bolt, O, which passes through a vertical hole in the coupling-block R.

Through the forward end of the block P is formed a horizontal hole to receive the bolt Q, which pivots the forked forward end of the short bar R to the said block P. The rear end of the forked coupling-bar R passes through and works in a lug or bearing, S, attached to the center of the forward end or bend of the U-shaped frame T of the marker.

The coupling O P Q R S allows the rear end of the marker-frame T to move laterally and vertically and to rock, which three movements allows the marker to accommodate itself to the surface of the ground, however rough and uneven the said surface may be, without affecting the operation of the seed-dropping device.

In bearings attached to the rear ends of the side bars of the frame T revolves an axle, U, to each end of which, or to castings attached to the said ends, are attached the centers of two bars, V. The bars V cross each other at right angles and form skeleton or spoke wheels, and upon their ends are formed sharp-pointed feet $v'$, which are inclined forward, so that they may enter the ground squarely. The front and rear edges of the bars V, just above the feet $v'$, are made sharp, so that they may pass through the soil freely and without slipping, and may thus prevent any irregularity in dropping the seed. To the middle parts of the arms of the bars V are attached rings W, to strengthen the said arms and to form a support for the rollers X, which are pivoted to lugs attached to the said rings W. Two rollers, X, are attached to each ring W at equal distances apart, and the rollers of the two rings W alternate with each other, so that the seed-dropping device may be operated four times for each revolution of the axle U.

As the marker-wheels revolve, the rollers X of the two wheels strike the outer arms of the angle-levers Y alternately, and move them to operate the seed-dropping device. The angle-levers Y are pivoted at their angles to lugs attached to the outer sides of the side bars of the marker-frame T, and their lower arms are connected by a rod, Z, so that each may be moved by the movement of the other.

One of the pivots of the levers Y is replaced by the rear end of the rod A', which works in bearings or a bushing in the lugs that support the said lever Y, and the part which passes through the said lever and bushing is made square, so that the said rod A' may be rocked by the movements of the said angle-levers Y.

The forward end of the rod A' passes through and works in a bearing, B', which is swiveled at its opposite sides to and between the arms of a short U-bar, C'. The U-bar C' is swiveled at the center of its bend to the upper side of a rear cross-bar of the frame F. This coupling allows the rod A' to work freely when operated by the rollers X and levers Y, and also allows the said rod to move freely with the marker-frame T as it adjusts itself to the surface of the ground.

To the forward end of the rod A' is rigidly attached a short crank-arm, D', to which is pivoted the end of the connecting-rod E'. The other end of connecting-rod E' is pivoted to the end of a lever, F', which is pivoted at its middle part to a cross-bar of the frame F, and to its other end is pivoted the end of a short connecting-rod, G'. The other end of the connecting-rod G' is pivoted to the seed-dropping slide J, so that the said slide may be operated to drop the seed by the rocking of the rod A'.

To the frame C, a little in the rear of the axle B, are pivoted the ends of a crank-rod, H', the middle part of which crosses the lower side of the marker-frame T a little in the rear of the rear end of the carriage-frame C. To the middle part of the crank-rod H' is pivoted the rear end of the connecting-rod I', the forward end of which is pivoted to the lever J' at a little distance from its lower end. The lower end of the lever J' is pivoted to the axle B or the frame C, and its upper end projects upward into such a position that it may be conveniently reached and operated by the driver from his seat E.

To the sides of the side bars of the frame T are attached plates K', the lower edges of which are inclined and project beneath the lower sides of the said side bars, to serve as shoulders or catches for the crank-rod H' to rest against to support the marker when raised from the ground. The part of the crank-rod H' that comes in contact with the bars of the frame T may have rollers placed upon them to prevent friction as it moves along the said bars in raising the marker.

We reserve the right to make a separate application for Letters Patent on the marker and its mode of attachment to the planter-frame.

Having thus described our invention, we claim as new and desire to secure by Letters Patent—

The combination of the angle-levers Y, pivoted to lugs on the outer side of the side bars of the frame T, the connecting-rod Z, the rock-rod A', the crank-arm D', the connecting-rods E' G', and the pivoted lever F', with the rollers X on the rings W of the radial markers, and with the seed-dropping slide J, substantially as shown and described.

JAMES P. HALL.
HENRY JACOBSEN.

Witnesses:
JOHN W. BALLINGER,
H. NOTTELMANN.